(12) United States Patent
Cheng

(10) Patent No.: US 6,526,065 B1
(45) Date of Patent: Feb. 25, 2003

(54) CODE MANAGEMENT SYSTEM AND METHOD FOR CDMA COMMUNICATION NETWORKS

(75) Inventor: Ray-Guang Cheng, Keelong (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/234,871

(22) Filed: Jan. 21, 1999

(51) Int. Cl.[7] ................................................ H04J 13/00
(52) U.S. Cl. ...................................................... 370/441
(58) Field of Search ................................. 370/320, 335, 370/342, 441; 375/140, 145, 149

(56) References Cited

U.S. PATENT DOCUMENTS

| | | | | |
|---|---|---|---|---|
| 5,317,593 A | * | 5/1994 | Fulghum | ........................ 375/1 |
| 5,327,455 A | * | 7/1994 | De Gaudenzi et al. | ......... 375/1 |
| 5,442,625 A | * | 8/1995 | Gitlin et al. | |
| 6,041,034 A | * | 3/2000 | Fukumasa et al. | .......... 370/203 |
| 6,108,369 A | * | 8/2000 | Ovesjö et al. | ............... 375/146 |
| 6,163,524 A | * | 12/2000 | Magnusson et al. | ........ 370/208 |
| 6,259,721 B1 | * | 7/2001 | Uesugi et al. | .............. 375/130 |

* cited by examiner

*Primary Examiner*—Ken Vanderpuye
(74) *Attorney, Agent, or Firm*—Stevens, Davis, Miller & Mosher, LLP

(57) ABSTRACT

A system and method for assigning channelization (spreading) codes in CDMA communication networks using spread spectrum modulation techniques such that a minimum number of spreading codes are assigned by using an optimal codeword. A system codeword of a predetermined weight representing spreading codes for different spreading factors in the spread spectrum communication system is used, in conjunction with a user defined weight, to determine the optimal codeword such that a minimum number of spreading codes are assigned therewith.

19 Claims, 7 Drawing Sheets

| | SF=4 | SF=8 | SF=16 | SF=32 | SF=64 | SF=128 | SF=256 |
|---|---|---|---|---|---|---|---|
| $C_f$ (CODE-NUMBERS OF AVAILABLE SPREADING CODES BEFORE THE ASSIGNMENT) | 0 | 0 | 0 | 0 | 2 (7,11) | 1 (4) | 3 (1,5,9) |
| $C_{opt}$ (=$C_4$) CODE-NUMBERS OF ASSIGNED OPTIMAL SPREADING CODES | 0 | 0 | 0 | 0 | 1 | 0 | 2 |
| | | | | | 7 | | 1,5 |
| $C_f$ (RESULTING CODE-NUMBERS OF AVAILABLE SPREADING CODES AFTER THE ASSIGNMENT) | 0 | 0 | 0 | 0 | 1 (11) | 1 (4) | 1 (9) |

FIG. 4

| | SF=4 | SF=8 | SF=16 | SF=32 | SF=64 | SF=128 | SF=256 |
|---|---|---|---|---|---|---|---|
| $C_t$ (CODE-NUMBERS OF AVAILABLE SPREADING CODES BEFORE THE ASSIGNMENT) | 0 | 0 | 0 | 0 | 2 (7,11) | 1 (4) | 3 (1,5,9) |
| (ALTERNATIVE REPRESENTATION OF CODE-NUMBERS OF THE AVAILABLE SPREADING CODES) | | | | | (11) | (4,13,14) | (1,5,9) |
| $C'(=C_3)$ CODE-NUMBERS OF ASSIGNED ALTERNATIVE SPREADING CODES | 0 | 0 | 0 | 0 | 0 | 2 13,14 | 2 1,5 |
| $C_t$ (RESULTING CODE-NUMBERS OF AVAILABLE SPREADING CODES AFTER THE ASSIGNMENT) | 0 | 0 | 0 | 0 | 1 (11) | 1 (4) | 1 (9) |

FIG. 5

CODE MANAGEMENT SYSTEM AND METHOD FOR CDMA COMMUNICATION NETWORKS

BACKGROUND OF THE INVENTION

1. Field of the Invention

This invention generally relates to mobile wireless communication networks such as cellular telephone networks. More specifically, the present invention relates to a system and method for managing assignment of spreading codes used in a mobile cellular or wireless communication system using spread spectrum communication technology. The invention is useful for is systems providing different data rates (e.g., data services and voice users).

2. Description of the Related Art

The following references, incorporated by reference herein in their entireties, are helpful to an understanding of the principles of spread spectrum communications: (1) E. Dahlman and K. Jamal, "Wide-band services in a DS-CDMA Based FPLMTS System," IEEE VTC 1996, pp. 1656–1660; (2) ETSI SMG2, "The ETSI UMTS Terrestrial Radio Access (UTRA) ITU-RTT Candidate Submission," May/June 1998; (3) K. S. Gilhousen, "System and Method For Orthogonal Spread Spectrum Sequence Generation in Variable Data Rate Systems," U.S. Pat. No. 5,751,761, May 1998; and (4) Otani, "Smooth Spectrum Spreading with a Small Spreading Factor," U.S. Pat. No. 5,530,717, June, 1996.

Code Division Multiple Access (CDMA), also called Spread Spectrum (SS), is a technique for increasing the number of users or mobile stations that may be accommodated in a wireless communication system, such as a digital cellular phone service. There are three general categories of CDMA: Frequency hopping, direct sequence, and time scrambling. Direct Sequence (DS) CDMA is one of the potential multiple access candidates for an advanced communication system such as the IMT-2000 system which supports high-data-rate services and variable-bit-rate services, such as speech. For example, the variable-bit-rate service of the DS-CDMA based IMT-2000 system is supported by way of multi-code transmission or single-code transmission using a variable spreading factor (VSF). Reference (4) describes a DS-CDMA system.

In reference (1), Dahlman, et al. compared multi-code transmission and single-code transmission using a variable spreading factor to implement variable-bit-rate services in a DS-CDMA based system. In particular, the performance, complexity, and flexibility of the two transmission methods were studied. The study concluded that single-code transmission with variable spreading factors allows for simpler implementation of variable-rate services and is preferred from a complexity point-of-view. On the other hand, multi-code transmission, which uses orthogonal codes for different connections on the forward link (downlink), is preferred from a capacity point-of-view. As a result, Dahlman, et al. recognized benefits of using a hybrid solution wherein multi-code transmission is used on the forward link and single-code transmission with variable spreading factors is used on the reverse link (uplink).

In reference (2), ETSI SMG2 submitted a universal mobile telecommunication system (UMTS) terrestrial radio access (TRA) proposal to ITU as a candidate radio transmission technology (RTT) solution for IMT-2000. Orthogonal variable spreading factor (OVSF) codes are used as channelization (spreading) codes to distinguish between channels. OVSF codes can preserve the orthogonality between channels of different rates using different spreading factors.

Reference (3) proposed a method for allocating a set of orthogonal pseudo-noise (EN) code sequences of variable length among user channels operative at different data rates in a spread spectrum system. Orthogonal Walsh codes of variable length are employed to modulate the information signals. The code assignment is made on the basis of channel data rates in a manner that results in an improved utilization of the available frequency spectrum. In particular, Gilhousen proposed an ASSIGNED list and a BUSY list to handle the code assignment process. However, Gilhousen did not present efficient and optimal methods to handle the code.

Conventional spreading/modulation units in a CDMA system are illustrated in FIGS. 1 and 2, and the generation of OVSF codes is illustrated in FIG. 3.

In a CDMA system, each cell site (base station) has many modulator-demodulator units. Each modulator-demodulator unit at the base station is assigned to a mobile station as needed to provide a communication path between the base station and the mobile station. Examples of spreading/modulation units for downlink and uplink channels are discussed in reference (2) and shown in FIGS. 1 and 2, respectively.

FIG. 1 shows a spreading/modulation unit 10 having a channel 12 constituting a dedicated physical data channel (DPDCH) for carrying data generated at a second layer and a dedicated physical control channel (DPCCH) for carrying control information generated at a first layer. P(t) is a pulse shaping filter (root raised cosine, roll-off 0.22). A total number of bits per DPDCH/DPCCH channel determines a spreading factor (SF) used in the spreading/modulating unit 10. Each spreading factor corresponds to a fixed data rate requested by a user (e.g., different rates for data services or for voice users) and, e.g., may range from 4 to 256 in accordance with $256/2^k$ wherein k ranges from 0 to 6.

FIG. 2 illustrates a spreading/modulating unit 20 having a DPDCH channel 22 and a DPCCH channel 24. Data modulation is based on dual-channel quadrature phase shift keying (QPSK), where the channels DPDCH and DPCCH are mapped to the I and Q channels, respectively. Data in the I and Q channels are spread to the chip rate with two different channelization codes $C_D$ and $C_C$, and subsequently complex-scrambled by a mobile-station specific complex scrambling code $C'_{scramb}$ and optionally another scrambling code $C''_{scramb}$. P(t) is a pulse shaping filter (root raised cosine, roll-off 0.22).

OVSF codes as disclosed in reference [2] can be used as channelization codes $C_D$ and $C_C$ to preserve mutual non-interference among channels of different rates and different spreading factors. In particular, rate sets supported by the OVSF codes can be summarized as follows: a code with SF=i can support a basic rate of $256/i$ $R_0$ (e.g., a code with SF-256 can support a basic rate $R_0$, a code with SF-128 can support a basic rate $2R_0$, and a code with SF=64 can support a basic rate $4R_0$), and so on, noting that a maximum number of basic rate users supported by the system is 256. $R_0$ is a predetermined basic rate defined by the system. A code tree defining the OVSF codes is shown in FIG. 3.

In FIG. 3, each level in the code tree defines channelization codes of length spread factor (i.e., SF=1 in level 1, SF=2 in level 2, and SF=4 in level 3). Not all codes within the code tree can be used simultaneously within one cell. A code can be used in a cell if and only if no other code on the path from the specific code to the root of the tree or in the subtree below the specific code is used in the same cell. This means that the number of available channelization codes is not fixed but depends on the data rate and spread factor of each physical channel.

Random assignment of large-SF codes to low data rate (high spread factor) channels may preclude the use of a large number of small-SF codes, thus inefficiently limiting the number of remaining codes.

Despite the fact that the code is a valuable resource in a CDMA system, none of the references discussed above-discloses an optimal code assigning algorithm to provide an efficient and optimal method for allocating spreading codes, reducing the complexity of the code assignment process, and improving system utilization.

SUMMARY OF THE INVENTION

In view of the foregoing disadvantages with the prior art techniques, it is an object of the present invention to provide an improved system and method for managing assignments of spreading codes according to variable data rates requested by users such that a minimum number of spreading codes are assigned by way of an optimal codeword. Users operative at a particular data rate are assigned to closely related codes so as to minimize the number of small-SF codes being marked as unavailable.

The present invention is directed to a code-assignment system and method for managing either multi-code or single-code transmission in, e.g., a wideband CDMA system using OVSF codes. The present invention achieves the above object by establishing a system codeword to represent available spreading codes that can be used in a spread spectrum communication system, determining an optimal codeword based on a user defined weight and the system codeword, and assigning spreading codes based on the optimal codeword.

Other features and advantages of the invention will become apparent upon reference to the following description of the preferred embodiments, when read in light of the attached drawings.

BRIEF DESCRIPTION OF THE DRAWINGS

In the attached drawings:

FIG. 4 illustrates an embodiment of the code assignment system and method of the present invention;

FIG. 5 illustrates an alternative embodiment of the code assignment system and method of the present invention;

DESCRIPTION OF THE PREFERRED EMBODIMENTS

The present invention is directed to a system and method for managing assignments of spreading codes according to a data rate requested by a user, wherein a minimum number of spreading codes are assigned by using an optimal codeword. FIG. 4 illustrates an exemplary embodiment of the present invention using a codeword-table derived from a multi-code assignment algorithm as discussed below.

Figure 1:
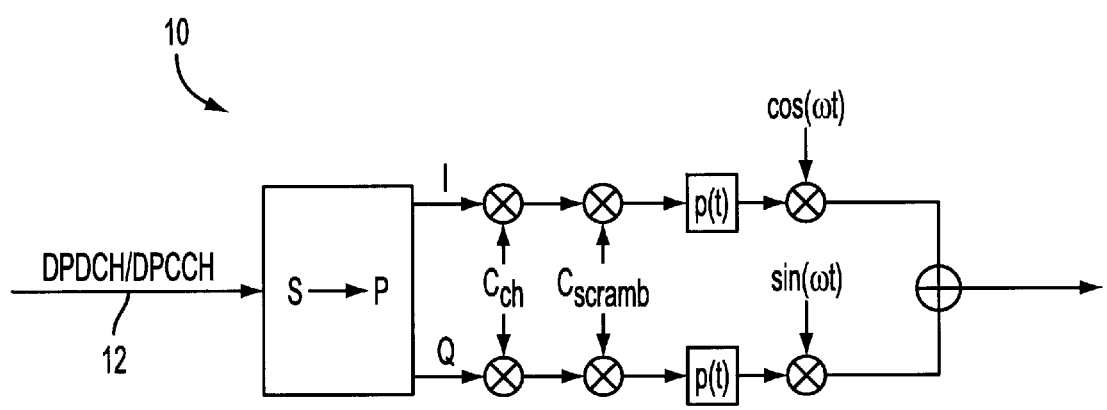
FIG. 1 is an illustration of a prior art spreading/modulation unit for downlink channels.
Figure 2:
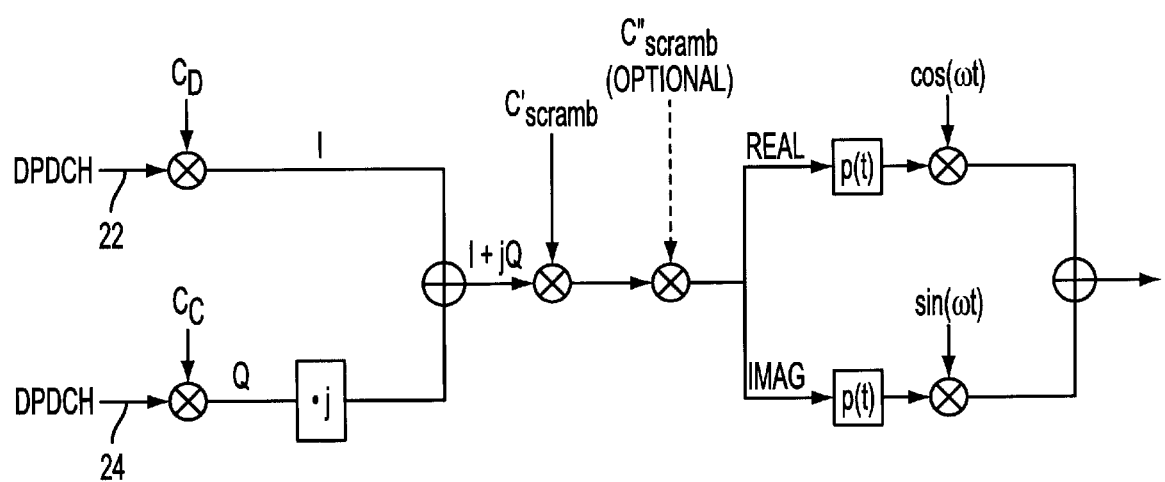
FIG. 2 is an illustration of a prior art spreading/modulation unit for uplink channels.
Figure 3:
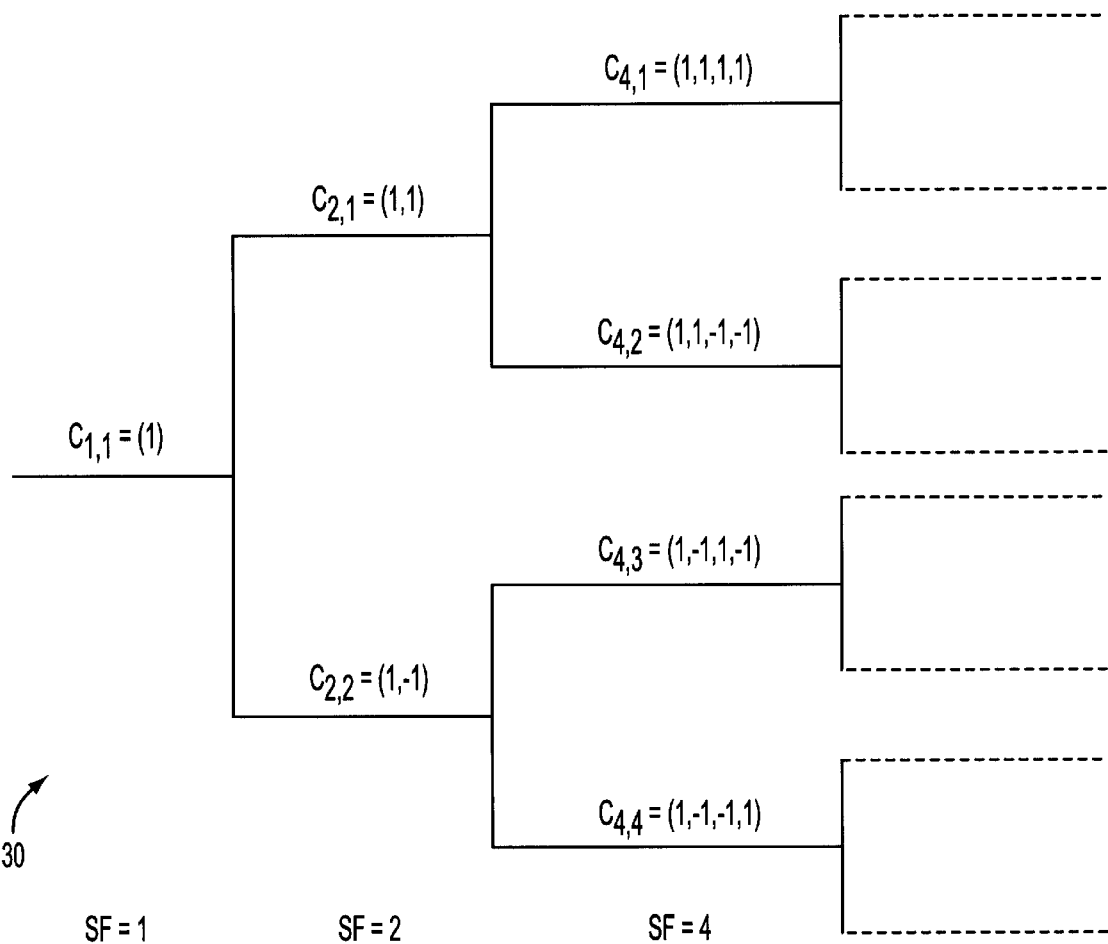
FIG. 3 is an illustration of a prior art code tree for illustrating orthogonal variable spreading factor codes.

In the multi-code assignment algorithm of the present invention; an ordered pair C is used to represent the available spreading codes held by the system for the different values of spread factor. C is herein denominated a codeword. For instance, $C=(a_1, a_2, a_3, a_4, a_5, a_6, a_7)$ denotes the number of available codes for SF=(4, 8, 16, 32, 64, 128, 256), respectively, where $a_1 \leq 4$, $a_2 \leq 8$, $a_3 \leq 16$, $a_4 \leq 32$, $a_5 \leq 64$, $a_6 \leq 128$, $a_7 \leq 256$. From the properties of OVSF codes, one code with SF=n can be decomposed into m codes with SF=m*n, where $m=2^i$, $n=2^j$, and i, j∈{2, 3, 4, 5, 6, 7, 8}. However, the code-conversion process is not reversible. That is, it may not be possible to combine m codes with SF=m*n into a single-code with SF=n. For example, as shown in the code tree of FIG. 3, $C_{2,1}$ can be decomposed into two codes $C_{4,1}$ and $C_{4,2}$. However, two codes $C_{4,1}$ and $C_{4,3}$ are not able to be combined into one code. The non-reversible property of the OVSF code-conversion may result in different system utilization due to different code assignment algorithms.

A codeword $C=(a_1, a_2, a_3, a_4, a_5, a_6, a_7)$ is said to be irreducible if all of the large-SF codes in the codeword can not be further combined into small-SF codes. The irreducible codeword reflects the current status of the code assignment. The irreducible codeword is used throughout the present invention.

Here, the weight W(C) of a codeword C is defined by $$W(C)=a_1 \cdot 2^6+a_2 \cdot 2^5+a_3 \cdot 2^4+a_4 \cdot 2^3+a_5 \cdot 2^2+a_6 \cdot 2^1+a_7. \quad (1)$$

Two codewords $C_1$ and $C_2$ are said to be equivalent if their weights $W(C_1)$ and $W(C_2)$ are equal. For example, $C_1=(1, 0, 0, 0, 0, 0, 0)$ and $C_2=(0, 2, 0, 0, 0, 0, 0)$ are equivalent because $W(C_1)=W(C_2)=64$. In the present invention, the weight of a codeword represents the maximum number of users that can be supported by the system if each user requests only the basic rate.

The equivalent code set S(n) is a set of equivalent codewords which has the same weight n.

In a set of codewords which have the same weight, a codeword is called a good codeword if it contains the maximum number of codes that has the lowest-valued SF among the code set. For example, $C=(0, 0, 0, 4, 0, 1, 1)$ is the good codeword in a code set T(35)={(0, 0, 0, 2, 3, 1, 5), (0, 0, 0, 2, 3, 2, 3), (0, 0, 0, 3, 1, 1, 5), (0, 0, 0, 3, 1, 2, 3), (0, 0, 0, 4, 0, 1, 1,)}, where T(35) is a subset of S(35) (i.e. $T(35) \subset S(35)$).

In the present invention, a system codeword is used to represent the status of the available codes that can be used by a system. The code-assigning algorithm is used to find suitable codes for a user such that the resulting system codeword after the code assignment procedure supports a maximum number of possible combinations of data rates. For example, both of the codewords $C_1=(1, 0, 0, 0, 0, 0, 0)$ and $C_2=(0, 2, 0, 0, 0, 0, 0)$, resulting from the code assignment algorithms $A_1$ and $A_2$, respectively, can support an aggregate data rate up to $64 \cdot R_0$. Both $C_1$ and $C_2$ can support two users each of whom require a data rate $32 \cdot R_0$. However, only $C_1$ can support a user who requires a data rate $64 \cdot R_0$. In this case, $A_1$ is the optimal assignment algorithm.

From the above definition, it can be found that each codeword in any given code set T(n) is resulting from a code-assigning algorithm. Initially, the system does not accommodate any user, and it has the initial codeword of $C_0=(4, 0, 0, 0, 0, 0, 0)$. By defining $C_t=(a_1, a_2, a_3, a_4, a_5, a_6, a_7)$ with weight m to be the system codeword observed at time t (i.e. $W(C_t)=m$), and considering a new user who requests a data rate of $n \cdot R_0$, the objective of the code assignment is to determine a codeword $C_{opt}=(b_1, b_2, b_3, b_4, b_5, b_6, b_7)$ from S(n) for the user such that $C_t'=(a_1', a_2', a_3', a_4', a_5', a_6', a_7')$ is the optimal codeword in the possible code set T(m−n) after the assignment, where $T(m-n) \subset S(m-n)$. The number of codes required in this code assignment algorithm, denoted by b, can be calculated by $b_1=b_1+b_2+b_3+b_4+b_5+b_6+b_7$, $b \leq k$, where k is the maximum number of allowable codes that could be used by a user. Let us first attempt to determine the optimal code-assigning algorithm while assuming that the value of k is not limited (i.e. k=∞).

Two codewords $C_1=(a_1, a_2, a_3, a_4, a_5, a_6, a_7)$ and $C_2=(b_1, b_2, b_3, b_4, b_5, b_6, b_7)$ are said to be equal, denoted by $C_1=C_2$, if and only if $a_j=b_i$ for i=1 to 7. The status of the two systems are said to be identical if their codewords are equal. The subtraction of two codewords is defined as the subtraction of the individual code. The subtraction is done code-by-code individually from right to left. In the subtraction, one code with code-number n of SF=k can be split into two codes with code numbers 2n−1 and 2n of SF=2k. For example, the status of the system at time t can be represented in terms of a codeword $C_t=(0, 0, 0, 0, 2, 1, 3)$ with weight 13.

Considering a case in which n=6 and k=∞, let us attempt to find the equivalent code set S(n) for n=6:

$$S(6)=\{(0, 0, 0, 0, 0, 0, 6), (0, 0, 0, 0, 0, 1, 4), (0, 0, 0, 0, 0, 2, 2),$$
$$(0, 0, 0, 0, 1, 0, 2), (0, 0, 0, 0, 0, 3, 0), (0, 0, 0, 0, 1, 1, 0)\}=$$
$$\{C_1, C_2, C_3, C_4, C_5, C_6\} \quad (2)$$

Therefore, the possible code set after the assignment should have a weight of 7 (i.e. 13−6). The resulting code set T(7) can be obtained by $$T(7)=\{C_t-C_1, C_t-C_2, C_t-C_3, C_t-C_4, C_t-C_5, C_t-C_6\}=(0, 0, 0, 1, 1, 1), (0, 0, 0, 0, 1, 1, 1), (0, 0, 0, 0, 1, 1, 1), (0, 0, 0, 0, 1, 1, 1), (0, 0, 0, 0, 1, 0, 3), (0, 0, 0, 0, 1, 0, 3)\} \quad (3)$$

Here, N(C) by $$N(C)=a_1+a_2+a_3+a_4+a_5+a_6+a_7 \quad (4)$$

where N(C) is the required number of spreading codes for transmitting a codeword $C=(a_1, a_2, a_3, a_4, a_5, a_6, a_7)$. According to the definition used herein, $\{C_1, C_2, C_3, C_4\}$ is the set of codewords that can result in a good codeword and $N(C_1)=6$, $N(C_2)=5$, $N(C_3)=4$, and $N(C_4)=3$, respectively. In the DS-CDMA system, the increased number of required codes for a user may result in an increased system complexity. Therefore, an optimal code assignment is the one that results in a good codeword and has a minimum N(C). In the example, the optimal multi-code assignment is $C_{opt}=C_4$. That is, one code with SF=64 and two codes with SF=256 can be selected from our table for assignment to the user.

Generally, there are several types of code assignments (i.e. $C_1, C_2, C_3, C_4$) that may result in the same system codeword and the same performance. In general it is not feasible to examine all of the possible codewords from the equivalent code set S(n) as illustrated above, especially for large n. It is also a time-consuming process to find the resulting code set T(m−n) by subtraction of the codewords individually. Accordingly, another embodiment of the present invention includes a fast code-assigning algorithm for finding the optimal codeword $C_{opt}$, which is given by $$C_{opt}=C_t-(C_t-(0, 0, 0, 0, 0, 0, n)) \quad (5)$$

where $n \cdot R_0$ is the data rate requested by the user. In the above example, $C_t=(0, 0, 0, 0, 2, 1, 3)$, n=6, and $C_t-(0, 0, 0, 0, 0, 0, 6)=(0, 0, 0, 0, 1, 1, 1)$. Therefore, $C_{opt}=(0, 0, 0, 0, 2, 1, 3)-(0, 0, 0, 0, 1, 1, 1)=(0, 0, 0, 0, 1, 0, 2)=C_4$. In a particular implementation, the multi-code assignment algorithm would maintain a list of available codes. When a request for channel codes is made, the number of codes of different spread factor required to support the user's data rate can be identified by the multi-code assignment algorithm of this invention. Upon identification of codes of suitable spread factor, the base station will assign the codes from the table. An implementation of the method using a codeword table for the example discussed above is illustrated in FIG. 4. An alternative of the assignment is illustrated in FIG. 5, in which the $C_{opt}$ (i.e. $C_4$) is replaced by an alternative codeword $C'=C_3=(0, 0, 0, 0, 0, 2, 2)$. It can be found that the resulting codes after assignment are similar in the cases illustrated in FIGS. 4 and 5. FIG. 4 is the optimal code assignment and FIG. 5 is an alternative code assignment which results in the same good codeword but requires more codes than the optimal code assignment does. In this example, $C_1, C_2, C_3$ are possible candidates for the alternative code assignment. In FIG. 5, it can be found that one code with code-number n (i.e. n=7 in the example) of SF=k (i.e. K=64 in the example) is split into two codes with code-numbers 2n−1 and 2n (i.e. 13, 14, in the example) of SF=2k.

Figure 6:
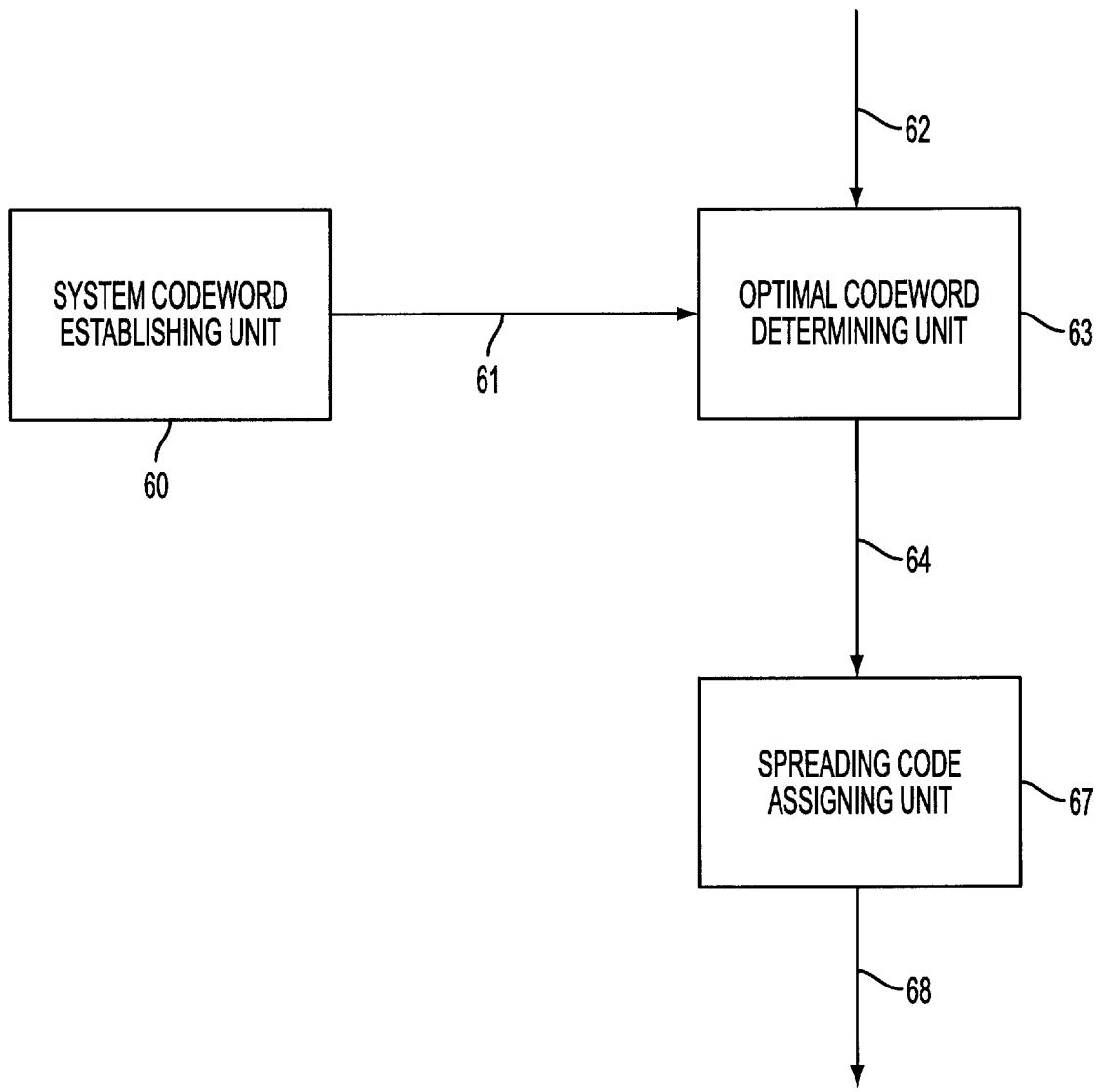
FIG. 6 is a block signal flow diagram which illustrates the operation of the code assignment system & method FIG. 4.

FIG. 6 shows the operation of the code assigning system of the present invention. First, a system codeword 61 establishing unit 60 establishes a system codeword of a predetermined weight representing available spreading codes for different spreading factors in the spread spectrum system. Thereafter, an optimal codeword determining unit 63 determines an optimal codeword 64 based on a weight 62 and the system codeword 61. Finally, a spreading code assigning unit 67 assigns optimal spreading codes 68 based on the optimal codeword 64.

Figure 7:
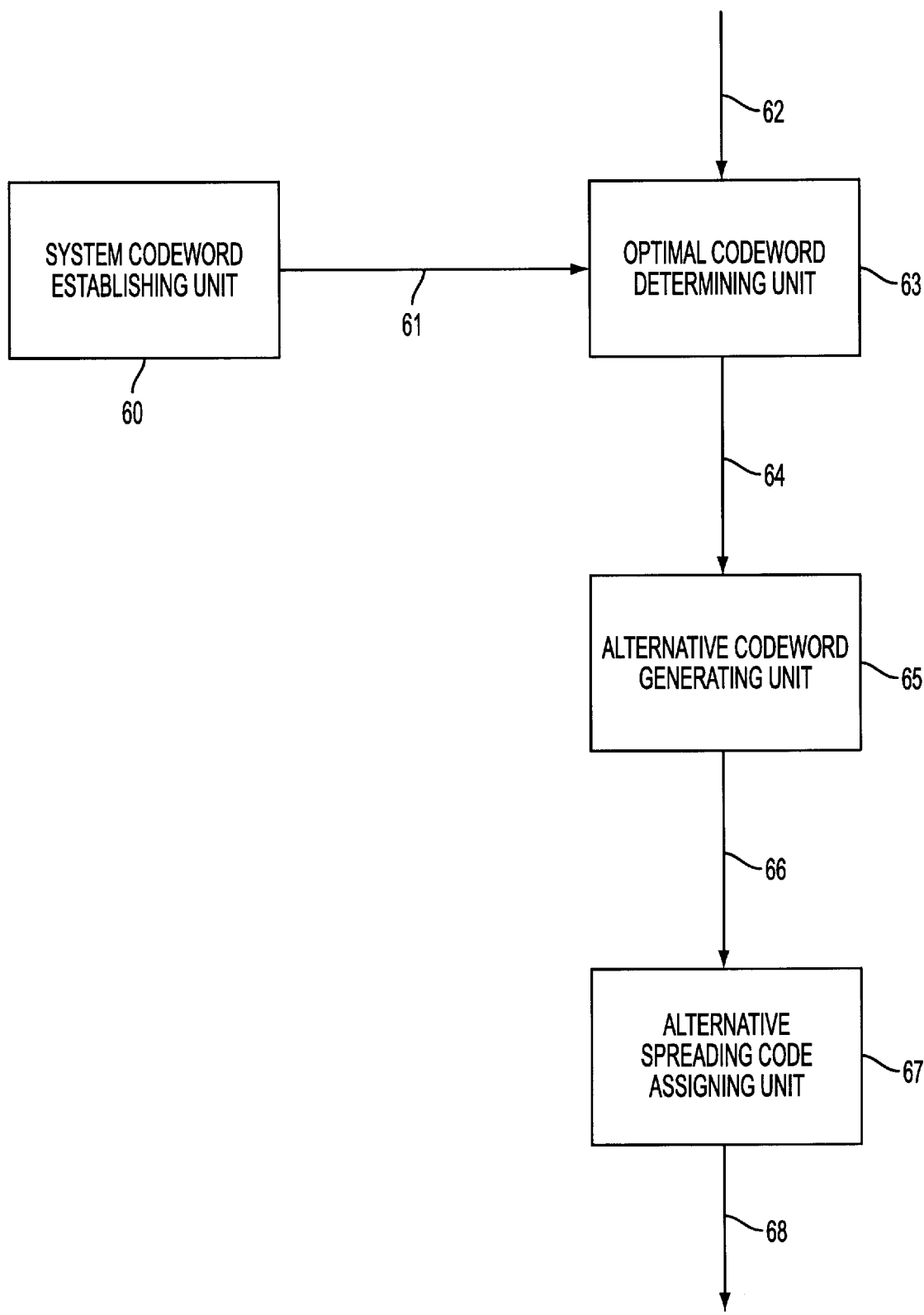
FIG. 7 is a block signal flow diagram which illustrates the operation of the alternative code assignment system and method of FIG. 5.

The operation of the code assigning system shown in FIG. 7 is similar to that shown in FIG. 6, except that the optimal codeword 64 is provided to an alternative codeword generating unit 65 which outputs an alternative codeword 66 and the alternative spreading code assigning unit 67 chooses one of the alternative codewords to assign alternative spreading codes 68.

In the present invention, the maximum number of codes that can be supported by a mobile station, denoted as k, is limited. Therefore, the following two regions are considered:

Region I. $N(C_{opt}) \leq k$:
The procedure mentioned above for k=∞ is a special case in this region. Therefore, the same procedure described above can still be used and the selected codeword $C=C_{opt}$.

Region II. $N(C_{opt}) > k$:
In this case, the optimal code assignment may not be achieved in this region, and the selected codeword C is the one where N(C)=k. In some cases, the new call request will be blocked if the system cannot support the requested data rate with the given number of codes.

While particular embodiments of the present invention have been shown and described, it will be apparent to those skilled in the art that various changes and modifications may be made therein without departing from the spirit or scope of the invention. Accordingly, it is intended that the appended claims cover such changes and modifications that come within the spirit and scope of the invention.

What is claimed is:

1. A code assigning system for use in a spread spectrum communication network, said code assigning system comprising:

means for establishing a system codeword representing available spreading codes for different spreading factors in said spread spectrum communication system;

means for determining an optimal codeword based on a weight and said system codeword, wherein said weight relates to a desired communication data rate requested of said communication network; and means for assigning optimal spreading codes based on said optimal codeword.

2. The system of claim 1, wherein said optimal codeword is established as follows:

$$C_{opt}=C_t-(C_t-(0,0,0,0,0,0,n))$$

where $C_{opt}$ represents said optimal codeword, n represents said weight, and $C_t$ represents said system codeword at time t.

3. The system of claim 1, wherein said means for determining an optimal codeword selects said optimal codeword from a set of equivalent codewords each having said weight.

4. The system of claim 3, wherein said optimal codeword has a minimum required number of spreading codes in said equivalent codewords.

5. The system of claim 4, wherein said required number of spreading codes is established as follows:

$$N(C)=a_1+a_2+a_3+a_4+a_5+a_6+a_7$$

where N(C) represents said code number, $C=(a_1, a_2, a_3, a_4, a_5, a_6, a_7)$ represents said required number of spreading codes, and $a_1 \sim a_7$ each represents a number of available said spreading codes for said different spreading factors.

6. The system of claim 5, wherein $a_1 \sim a_7$ correspond to said different spreading factors and are not greater than 4, 8, 16, 32, 64, 128, and 256, respectively.

7. The system of claim 5, wherein a weight W(C) of said codeword is determined as follows:

$$W(C)=a_1 \cdot 2^6+a_2 \cdot 2^5+a_3 \cdot 2^4+a_4 \cdot 2^3+a_5 \cdot 2^2+a_6 \cdot 2^1+a_7$$

8. The system of claim 1, wherein said means for assigning assigns spreading codes to provide a resulting system codeword after a code assignment, that supports a maximum number of possible combination of data rates.

9. A code assigning system for use in a spread spectrum communication network, said code assigning system comprising:

means for establishing a system codeword representing available spreading codes for different spreading factors for use in said spread spectrum communication system;

means for determining an optimal codeword based on a weight and said system codeword, wherein said weight relates to a desired communication data rate requested of said communication network;

means for generating an alternative optimal codeword selected from a set of good codewords which includes said optimal codeword determined by said means for determining; and means for assigning spreading codes based on said alternative optimal codeword.

10. The apparatus of claim 9, wherein said optimal codeword is determined as follows:

$$C_{opt}=C_t-(C_t-(0,0,0,0,0,0,n))$$

where $C_{opt}$ represents said optimal codeword, n represents said weight, and $C_t$ represents said system codeword at time t.

11. The system of claim 9, wherein lengths of said spreading codes correspond to said different spreading factors and are not greater than 4, 8, 16, 32, 64, 128, and 256, respectively.

12. A code assigning method for use in a spread spectrum communication network, said method comprising the steps of:

establishing a system codeword to represent available spreading code for different spreading factors for use in spread spectrum communication system;

determining an optimal codeword based on a weight and said system codeword, wherein said weight relates to a desired communication data rate requested of said communication network; and assigning optimal spreading codes based on said optimal codeword.

13. The method of claim 12, wherein said determining step is calculated as follows:

$$C_{opt}=C_t-(C_t-(0,0,0,0,0,0,n))$$

where $C_{opt}$ represents said optimal codeword, n represents said weight, and $C_t$ represents said system codeword at time t.

14. The method of claim 12, wherein lengths of said spreading codes correspond to said different spreading factors and are not greater than 4, 8, 16, 32, 64, 128, and 256, respectively.

15. The method of claim 12, wherein said assigning step comprises assigning spreading codes to provide a resulting system codeword after a code assignment, that supports a maximum number of possible combination of data rates.

16. The method of claim 12, wherein said determining step selects an optimal codeword from a set of equivalent codewords each having said weight.

17. A code assigning method for use in a spread spectrum communication network, said method comprising the steps of:

establishing a system codeword to represent spreading codes for different spreading factors for use in said spread spectrum communication system;

determining an optimal codeword based on a weight and said system codeword, wherein said weight relates to a desired communication data rate requested of said communication network;

generating an alternative optimal codeword selected from a set of good codewords which includes said optimal codeword determined in said determining step; and assigning spreading codes based on said alternative codeword.

18. The method of claim 17, wherein said determining step is calculated as follows:

$$C_{opt}=C_t-(C_t-(0,0,0,0,0,0,n))$$

where $C_{opt}$ represents said optimal codeword, n represents said weight, and $C_t$ represents said system codeword at time t.

19. The method of claim 17, wherein lengths of said spreading codes correspond to said different spreading factors and are not greater than 4, 8, 16, 32, 64, 128, and 256, respectively.

* * * * *